United States Patent
Shvodian

(10) Patent No.: US 11,153,831 B1
(45) Date of Patent: Oct. 19, 2021

(54) DYNAMICALLY ACCOUNTING FOR PAST TRANSMIT POWER AS BASIS TO SET FUTURE TRANSMIT POWER

(71) Applicant: Sprint Spectrum L.P., Overland Park, KS (US)

(72) Inventor: William Shvodian, McLean, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 16/947,229

(22) Filed: Jul. 23, 2020

(51) Int. Cl.
*H04W 52/22* (2009.01)
*H04W 52/36* (2009.01)
*H04W 52/14* (2009.01)

(52) U.S. Cl.
CPC ....... *H04W 52/228* (2013.01); *H04W 52/146* (2013.01); *H04W 52/225* (2013.01); *H04W 52/367* (2013.01)

(58) Field of Classification Search
CPC .............................................. H04W 52/00–60
See application file for complete search history.

(56) References Cited

U.S. PATENT DOCUMENTS

| | | | |
|---|---|---|---|
| 2014/0162592 A1* | 6/2014 | Peitzer | H04W 52/28 455/405 |
| 2014/0187281 A1* | 7/2014 | Faraone | H04W 52/288 455/522 |
| 2018/0048994 A1* | 2/2018 | Kwon | H04W 72/1294 |
| 2019/0104476 A1* | 4/2019 | Lim | H04W 52/367 |
| 2020/0329485 A1* | 10/2020 | Tsai | H04W 72/1257 |
| 2021/0051599 A1* | 2/2021 | Cha | H04B 17/318 |
| 2021/0067189 A1* | 3/2021 | Yu | H04W 52/228 |

\* cited by examiner

*Primary Examiner* — Raymond S Dean

(57) ABSTRACT

A method and system for controlling uplink transmit power of a UE, for instance on an FDD connection. An example method includes, iteratively for each successive given time interval of a continuum of equal-duration time intervals (i) determining an actual average transmit power of the UE in the given time interval, (ii) using the determined actual average transmit power of the UE in the given time interval as a basis to set a maximum average transmit power of the UE in a respective subsequent time interval of the continuum of time intervals, and (iii) applying the set maximum average transmit power as a limitation on uplink transmit power of the UE in the respective subsequent time interval.

20 Claims, 5 Drawing Sheets

DYNAMICALLY ACCOUNTING FOR PAST TRANSMIT POWER AS BASIS TO SET FUTURE TRANSMIT POWER

BACKGROUND

A typical wireless communication system includes a number of access nodes that are configured to provide coverage in which user equipment devices (UEs) such as cell phones, tablet computers, machine-type-communication devices, tracking devices, embedded wireless modules, and/or other wirelessly equipped communication devices (whether or not user operated), can operate. Further, each access node could be coupled with a core network that provides connectivity with various application servers and/or transport networks, such as the public switched telephone network (PSTN) and/or the Internet for instance. With this arrangement, a UE within coverage of the system could engage in air-interface communication with an access node and could thereby communicate via the access node with various application servers and other entities.

Such a system could operate in accordance with a particular radio access technology (RAT), with communications from an access node to UEs defining a downlink or forward link and communications from the UEs to the access node defining an uplink or reverse link.

Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO). And recently, the industry has completed initial specifications for "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

In accordance with the RAT, each access node could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in RF spectrum) having a bandwidth and a center frequency and thus extending from a low-end frequency to a high-end frequency.

Each such carrier could be defined within an industry standard frequency band, by its frequency channel(s) being defined within the frequency band. Examples of such frequency bands include (i) bands 2, 4, 12, 25, 26, 66, 71, and 85, supporting FDD carriers (ii) band 41, supporting TDD carriers, and (iii) bands n258, n260, and n261, supporting FDD and TDD carriers, among numerous other possibilities.

Further, on the downlink and uplink channels, the coverage of each access node could define an air interface configured in a specific manner to define physical resources for carrying information wirelessly between the access node and UEs.

Without limitation, for instance, the air interface could be divided over time into a continuum of frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs.

In addition, certain resource elements on the example air interface could be reserved for special purposes. For instance, on the downlink, certain resource elements could be reserved to carry synchronization signals that UEs could detect as an indication of the presence of coverage and to establish frame timing, other resource elements could be reserved to carry a reference signal that UEs could measure in order to determine coverage strength, and still other resource elements could be reserved to carry other control signaling such as PRB-scheduling directives and acknowledgement messaging from the access node to served UEs. And on the uplink, certain resource elements could be reserved to carry random access signaling from UEs to the access node, and other resource elements could be reserved to carry other control signaling such as PRB-scheduling requests and acknowledgement signaling from UEs to the access node.

OVERVIEW

When a UE enters into coverage of such a system, the UE could detect threshold strong coverage of an access node on a carrier (e.g., a threshold strong reference signal broadcast by the access node on that carrier) and could then engage in random-access and connection signaling with the access node to establish an air-interface connection, such as a Radio Resource Control (RRC) connection, through which the access node will then serve the UE on the carrier.

Further, if the UE is not already registered for service with the core network, the UE could transmit to the access node an attach request, which the access node could forward to a core-network controller for processing. And the core-network controller and access node could then coordinate setup for the UE of one or more user-plane bearers, each including an access-bearer portion that extends between the access node and a core-network gateway that provides connectivity with a transport network and a data-radio-bearer portion that extends over the air between the access node and the UE.

Once the UE is so connected and registered, the access node could then serve the UE in a connected mode over the air-interface connection, managing downlink air-interface communication of data to the UE and uplink air-interface communication of data from the UE.

For instance, when the core-network gateway receives user-plane data for transmission to the UE, the data could flow to the access node, and the access node could buffer the data, pending transmission of the data to the UE. With the example air-interface configuration noted above, the access node could then allocate downlink PRBs in an upcoming subframe for carrying at least a portion of the data, defining a transport block, to the UE. And the access node could then transmit to the UE in a control region of that subframe a Downlink Control Information (DCI) message that designates the allocated PRBs, and the access node could accordingly transmit the transport block to the UE in those designated PRBs.

Likewise, on the uplink, when the UE has user-plane data for transmission on the transport network, the UE could buffer the data, pending transmission of the data to the access node, and the UE could transmit to the access node a scheduling request that carries a buffer status report (BSR) indicating the quantity of data that the UE has buffered for transmission. With the example air-interface configuration noted above, the access node could then allocate uplink PRBs in an upcoming subframe to carry a transport block of the data from the UE and could transmit to the UE a DCI message that designates those upcoming PRBs. And the UE could then accordingly transmit the transport block to the access node in the designated PRBs.

Certain systems may also support carrier-aggregation service, where an access node serves a UE concurrently on multiple carriers, referred to as component carriers. To configure carrier aggregation service, once a UE has connected with an access node on a given carrier, referred to as the UE's primary component carrier (PCC), the access node could add to the UE's connection one or more secondary carriers, each referred to as a secondary component carrier (SCC). With carrier-aggregation configured, the access node could then coordinate air-interface communication with the UE on PRBs distributed across the UE's component carriers.

In a representative implementation, such a UE could be equipped with a variable-gain power amplifier and associated logic that enables the UE to transmit on the uplink with dynamically set transmit power. And as the access node serves the UE, the access node and UE could regularly engage in a power control process to control the UE's transmit power.

In an example of such a power control process, an uplink receiver at the access node could estimate a receive signal-to-interference-plus-noise-ratio (SINR) of transmission from the UE on a per subframe basis or the like and could compare that SINR with an SINR target (which might be dynamically set based on observed communication error rate). When the SINR is below the SINR target, the access node could then transmit to the UE a power-up transmit power control (TPC) command to which the UE would respond by incrementally increasing its transmit power. Whereas, when the SINR is above the SINR target, the access node could transmit to the UE a power-down TPC command to which the UE would respond by incrementally decreasing its transmit power.

In addition, industry standards, regulations, or other policy may restrict the UE's average transmit power to not exceed a defined specific absorption rate (SAR). In a representative implementation, the SAR limit might be 1.6 watts per kilogram (1.6 W/kg) average over a 6-minute window. This can usually be met by a UE transmitting 23 decibel-milliwatts (dBm) (200 milliwatts) continuously or on average over a 6-minute window. But other examples could apply as well.

The practical impact of this average transmit power limit on operation of the UE could relate to both the UE's actual transmit power and the UE's duty cycle, i.e., how often the UE's uplink transmission is active. For instance, if the UE transmits continuously in each subframe for at least the SAR time window (e.g., 6 minutes), then the UE's actual instantaneous transmit power in each subframe for that period of time should be restricted to not exceed the SAR limit (e.g., 23 dBm). Whereas, if the UE alternates equal amounts of time (e.g., on a subframe basis) between transmitting and not transmitting for a duration of at least the SAR time window, then the UE's actual instantaneous transmit power each time the UE transmits could in theory be up to twice the SAR limit (e.g., 23 dBm×2=26 dBm), since the UE's average transmit power for that duration would be half of its actual transmit power.

At least when a UE is in relatively poor RF coverage, it may be desirable for a UE to operate with as high uplink transmit power as permissible, because higher uplink transmit power could help improve the overall quality and speed of the UE's uplink communication. For instance, while working to ensure that the UE stays within the SAR limit on average over the SAR time window, it could be desirable for the UE to operate with instantaneous transmit power higher than the SAR limit from time to time.

Optimally, this could be done if the UE is served on a TDD carrier, as the uplink of the TDD carrier would be active only some of the time. In particular, the air interface on a TDD carrier could have a TDD configuration (i.e., frame configuration, sub-frame configuration, or downlink-uplink configuration) that defines which subframes per frame are for downlink communication and which subframes per frame are for uplink communication (and possibly defines certain special subframes for transition from downlink to uplink).

The TDD configuration of the carrier would thus effectively define a theoretical maximum uplink duty cycle at which the UE could engage in uplink transmission on the carrier. And therefore, the UE's instantaneous transmit power per subframe could exceed the SAR limit, as the UE's average transmit power would be reduced by the UE's duty cycle and thus remain within the SAR limit. For example, if the TDD configuration defines a 50% uplink duty cycle, then the UE's instantaneous transmit power per uplink subframe could be twice the SAR limit (e.g., 2×23 dBm=26 dBm).

Unfortunately, however, in normal operation, the same cannot be said for an FDD carrier. As an FDD carrier has co-existing downlink and uplink frequency channels, there could be both downlink communication in every subframe per frame and uplink communication in every subframe per frame. The uplink of the FDD carrier could thus be always on, without a duty cycle, in which case the UE's instantaneous transmit power per subframe on the FDD carrier should be limited to the SAR limit.

One way to help overcome this technical issue with FDD operation is to impose a duty cycle on the uplink channel of the FDD carrier and to set the UE's maximum uplink transmit power such that the UE's average FDD uplink transmit power would be within the SAR limit. For example, if the UE's uplink on the FDD carrier would have a 50% duty cycle, then—as with the TDD carrier example noted above, then the UE's instantaneous transmit power per subframe could be twice the SAR limit. Imposing an uplink duty cycle on an FDD carrier, however, is complicated and may increase uplink latency.

Disclosed herein is a mechanism to help overcome this problem. In accordance with the disclosure, when a UE operates on an FDD carrier, the UE could use its actual transmit power per interval of time as a basis to control its maximum transmit power in a subsequent time interval, such that the UE's average transmit power over at least those time intervals would be within the SAR limit.

By way of example, the UE could divide the FDD air interface into a continuum of equal length time intervals that are optimally much shorter than the SAR time window (e.g., perhaps no longer than half of the SAR time window), and the UE could then apply this process on a per time interval basis. For each time interval, N, the UE could determine the UE's actual average transmit power (accounting for any variation in the UE's actual transmit power throughout the given time interval). And if that determined actual average transmit power is less than the SAR limit, then the UE could add the linear difference between those values on to the SAR limit to establish a maximum average transmit power for the next time interval, N+1. For instance, if the SAR limit is 23 dBm, and if the UE's actual average transmit power in interview N is just 20 dBm, then the UE could set its maximum average transmit power for interval N+1 to be 24.8 dBm (i.e., 23 dBm+20 dBm).

In addition, the same principles could be applied when a UE is served with uplink carrier aggregation or dual connectivity on a combination of multiple FDD carriers. In that situation, the UE and access node could likewise engage in power control to control the UE's uplink transmit power, but the power control could apply as to the UE's aggregate transmit power across the multiple FDD carriers. And the SAR limit could likewise apply to limit the UE's average aggregate transmit power across the FDD carriers. In that situation, the UE could thus similarly apply the present process on a per time-interval basis. Namely, for each time interval, N, the UE could compute the linear difference between the SAR limit and the UE's actual average aggregate transmit power across the FDD carriers. And if that difference is positive, the UE could add the difference to the SAR limit to establish a maximum average aggregate transmit power for a subsequent time interval, N+1. Or the power could be first allocated to the PCell for uplink carrier aggregation or dual connectivity, then the remaining average power could be allocated to the SCell on the subsequent interval.

Note also that the examples N and N+1 here are not intended to restrict the process to application with contiguous time intervals. The UE could just as well apply the process with using the balance of its transmit power in interval N as a basis to set its transmit power in interval N+2 or N+3, among other possibilities.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

Figure 1:
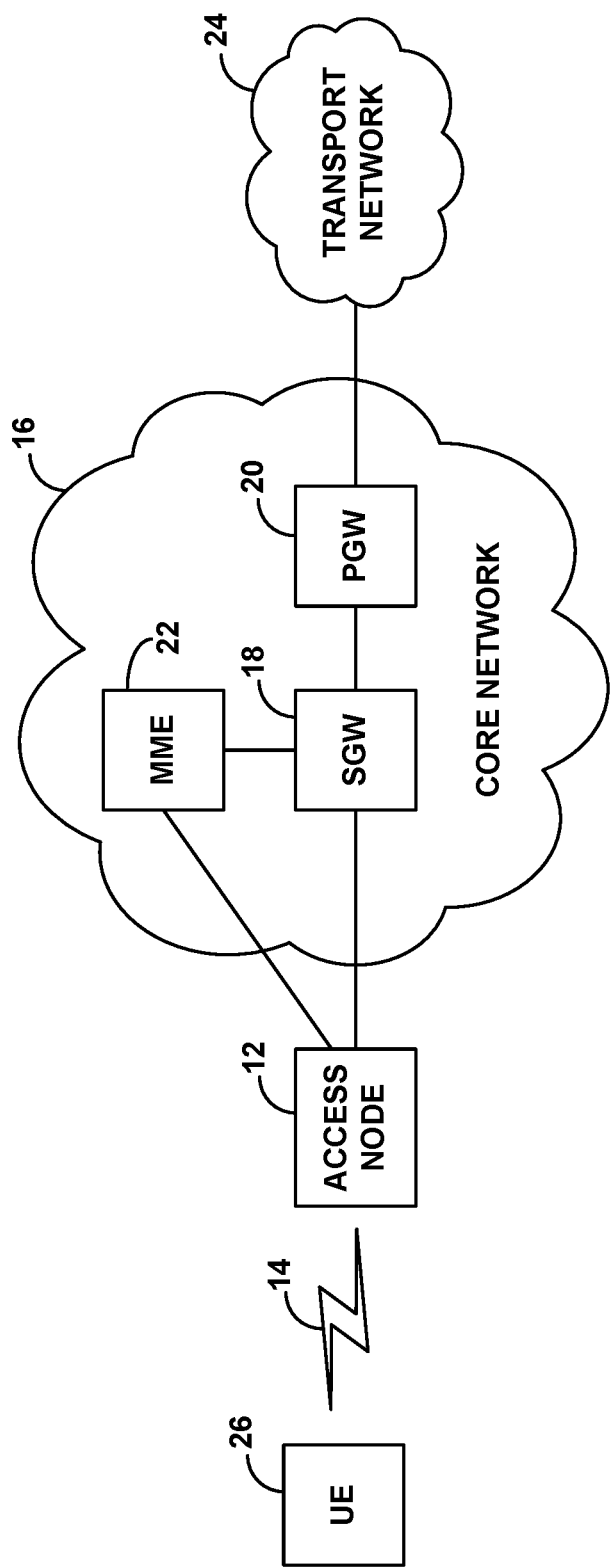
FIG. 1 is a simplified block diagram of an example network arrangement in which features of the present disclosure can be implemented.

An example implementation will now be described in the context of 4G LTE or 5G NR. It should be understood, however, that the principles disclosed herein could extend to apply with respect to other scenarios as well, such as with respect to other RATs and with other dual-connectivity configurations. Further, it should be understood that other variations from the specific arrangements and processes described are possible. For instance, various described entities, connections, functions, and other elements could be added, omitted, distributed, re-located, re-ordered, combined, or changed in other ways. In addition, it will be understood that technical operations disclosed as being carried out by one or more entities could be carried out at least in part by a processing unit programmed to carry out the operations or to cause one or more other entities to carry out the operations FIG. 1 is a simplified block diagram of an example system including an access node 12, which might be a 4G LTE evolved Node-B (eNB) or a 5G NR next-generation Node-B (gNB), among other possibilities. This access node 12 could be a macro access node of the type configured to provide a wide range of coverage or could take other forms, such as a small cell access node, a relays, a femtocell access node, or the like, possibly configured to provide a smaller range of coverage.

The access node 12 could have a respective antenna structure, perhaps an antenna array, that is configured to transmit and receive electromagnetic signals in a region defined by an antenna pattern or radiation pattern. Further, the access node 12 could be configured to provide coverage on one or more FDD carriers 14, each of which as noted above would have separately defined frequency channels respectively for downlink and uplink use.

On the downlink and uplink, the air interface on each such FDD carrier 14 could be structured as described above by way of example, being divided over time into frames, subframes, and symbol time segments, and over frequency into subcarriers, thus defining an array of air-interface resource elements grouped into PRBs allocable by the access node as noted above, for use to carry data to or from served UEs.

In the example arrangement of FIG. 1, the access node 12 is interfaced with a core network 16, such as an Evolved Packet Core (EPC) network or Next Generation Core (NGC) network. In the example shown, the core network 16 includes a serving gateway (SGW) 18, a packet data network gateway (PGW) 20, and a mobility management entity (MME) 22, although other arrangements are possible as well.

With this arrangement, the access node 12 could have an interface with the SGW 18, the SGW 18 could have an interface with the PGW 20, and the PGW 20 could provide connectivity with a transport network 24. Further, the access node 12 could have an interface with the MME 22, and the MME 22 could have an interface with the SGW 18, so that the MME 22 could coordinate setup of bearers for UEs to enable the UEs to engage in wireless packet-data communication.

FIG. 1 also illustrates an example UE 26 in coverage of the access node 12.

In line with the discussion above, upon entering into coverage of the access node 12, the UE could scan for and discover coverage of the access node 12 and could responsively engage in random access and connection signaling with the access node 12 to establish an RRC connection. Further, the UE could engage in attach signaling with the MME 22, via the access node 12, and the MME 22 could coordinate setup for the UE of at least one user-plane bearer, including an access-bearer portion extending between the access node 12 and the PGW 20 and a data-radio-bearer portion extending over the air between the access node 12 and the UE. And the access node 12 might also add one or more additional FDD carriers 14 to the UE's connection to provide the UE with uplink FDD carrier aggregation.

Once the UE is so connected, as noted above, the access node 12 could then serve the UE on the UE's FDD connection, coordinating downlink and uplink transmission on PRBs as necessary. As to the uplink for instance, as noted above, when the UE has data to transmit, the UE could transmit a scheduling request to the access node 12, the access node 12 could transmit to the UE a DCI message directing the UE to transmit on one or more uplink PRBs in an upcoming subframe, and the UE could engage in the transmission accordingly. Further, this process could continue repeatedly as the UE has a quantity of data buffered for transmission. And the access node 12 could alternatively apply semi-persistent scheduling, coordinating for the UE transmission one or more uplink PRBs per subframe or the like without a need for the UE to send a scheduling request for each transmission.

As noted above, the example UE could include a variable-gain power amplifier, and the access node 12 and UE could engage in a power control process to control the UE's transmit power on a per subframe basis or other basis. Namely, each time the access node receives a data transmission from the UE, the access node could evaluate the receive SINR of that transmission and, based on a set-point comparison, could then transmit to the UE (e.g., in a DCI message) a power-down or power-up TPC command.

As indicated above, the UE's ability to increment its transmit power could be limited by standards or regulations to not exceed a particular SAR limit on average over a defined SAR time window. Without limitation, as noted above for instance, the SAR limit could be 1.6 watts per kilogram (1.6 W/kg) average over a 6-minute window. This can usually be met by a UE transmitting 23 dBm.

As further noted above, to help maximize the UE's transmit power on the FDD connection, while keeping the UE's average transmit power within the SAR limit, the present disclosure provides for the UE dividing the air interface on its FDD connection into a continuum of equal length time intervals that are much shorter than the SAR time window, and using its actual average transmit power in each time interval on the FDD connection as a basis to set its maximum average transmit power in a respective subsequent time interval on the FDD connection, such that the UE's average transmit power over at least those time intervals would be within the SAR limit.

Further, the disclosure provides for the UE repeating this process iteratively over time with the same spacing between each time interval and its respective subsequent time interval, so that the UE's average transmit power over time continues to be within the SAR limit. For instance, the UE could use its actual average transmit power in each time interval, N, as a basis to set its maximum average transmit power respectively in the immediately following time interval, N+1. Or the UE could use its actual average transmit power in each time interval, N, as a basis to set its maximum average transmit power respectively in the second time interval later, N+2. Other examples are possible as well.

The time intervals into which the UE divides its FDD connection could be smaller than $1/10^{th}$ of the SAR time window and perhaps less than $1/100^{th}$ of the SAR time window, with shorter intervals allowing for better averaging. Thus, the time intervals could be on the order of milliseconds, with the SAR time window being on the order of minutes. For instance, the time intervals could be 5 milliseconds or 10 milliseconds long.

Iteratively for each given time interval, the UE could compute its actual average transmit power, $P_{avg}$, over the duration of the time interval, accounting for any variations based on the power control process for instance. The UE could then determine if the computed actual average transmit power $P_{avg}$ is less than the SAR limit. If the UE determines that the computed actual average transmit power $P_{avg}$ is not less than the SAR limit, then, responsive to the determination, the UE could apply the SAR limit as the UE's maximum transmit power in the subsequent time interval. Whereas, if the UE determines that the computed actual average transmit power is less than the SAR limit, then, responsive to the determination, the UE could compute and apply, as its maximum average transmit power in the subsequent time interval, a linear sum of (i) the SAR limit and (ii) the linear difference between the SAR limit and the computed actual average transmit power.

Phrased another way, if the computed actual average transmit power in a given time interval, N, is $P_{avg}$ and the SAR limit is S, then, in the scenario where the UE determines that the computed actual average transmit power in the given time interval is less than the SAR limit, the UE could compute a maximum average transmit power, $P_{max}$, according to the following equation (among other possibilities):

$$P_{max} = (2 \times S) - P_{avg}.$$

And the UE could then apply $P_{max}$ as the UE's maximum average transmit power in a respective subsequent time interval.

To apply the computed maximum average transmit power in the respective subsequent time interval, the UE could work to ensure that its average transmit power over the course of the subsequent time interval does not exceed the computed maximum. One way to accomplish this is for the UE to set the computed maximum average transmit power as its maximum or peak transmit power in the subsequent time interval, thus avoiding transmission at higher than that power level throughout the duration of the subsequent time interval. Another way to accomplish this is for the UE to monitor its average transmit power over time during the subsequent time interval and to dynamically adjust the transmit power throughout the subsequent time interval so as to keep the average transmit power within the computed maximum.

Figure 2:
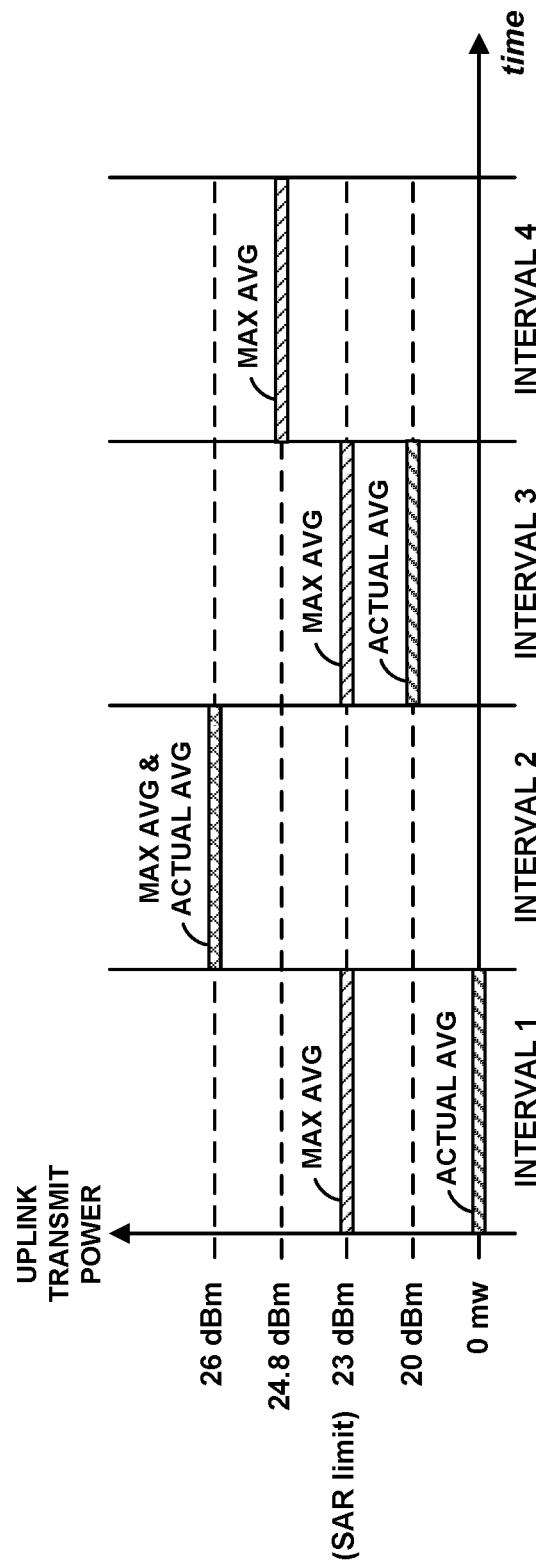
FIG. 2 is a diagram depicting example time intervals and transmit power levels in an example implementation.

FIG. 2 is a diagram illustrating how this process can play by way of example out over a representative sequence of four time intervals, with the UE's actual average transmit power in each time interval being used to control the UE's maximum average transmit power in the immediately following time interval.

The figure shows a graph with time along the x axis and transmit power in linear (rather than logarithmic) intervals along they y axis. In particular, the figure depicts example time intervals 1, 2, 3, and 4. And the figure depicts example transmit power levels of approximately 0 (zero) milliwatts, 100 milliwatts (20 dBm), 200 milliwatts (23 dBm), 300 milliwatts (24.8 dBm), and 400 milliwatts (26 dBm). Further, the figure shows an example SAR limit of 23 dBm. And the figure shows for each time interval (i) the UE's set maximum average transmit power and (ii) the UE's actual average transmit power.

In the example illustrated, in Interval 1, the UE's set maximum average transmit power is 23 dBm, and the UE's actual average transmit power is zero (e.g., zero milliwatts). Because this actual average transmit power is less than the SAR limit, the UE computes and sets for Interval 2 a maximum average transmit power equal to (i) the SAR limit plus (ii) the difference between the SAR limit and the UE's actual average transmit power in Interval 1. Thus, the UE computes and sets for Interval 2 a maximum average transmit power of 26 dBm.

In Interval 2, the UE's set maximum average transmit power is thus 26 dBm, and the UE's actual average transmit power is also 26 dBm. Because this actual average transmit power is not less than the SAR limit, the UE sets for Interval 3 a maximum average transmit power equal to the SAR limit.

In Interval 3, the UE's set maximum average transmit power is thus 23 dBm, and the UE's actual average transmit power is 20 dBm. Because this actual average transmit power is less than the SAR limit, the UE computes and sets for Interval 4 a maximum average transmit power equal to (i) the SAR limit plus (ii) the difference between the SAR limit and the UE's actual average transmit power in Interval 3. Thus, the UE computes and sets for Interval 4 a maximum average transmit power of 24.8 dBm.

This process would then continue iteratively for each successive time interval.

And optimally through this process, as illustrated by this example, the UE could thus transmit at higher than the SAR limit from time to time on the UE's FDD connection, which may help improve the quality and speed of the UE's transmission and may help provide improved user experience.

Note also that, while the above description focuses on application of this process as to an FDD connection encompassing one or more FDD carriers, the described principles could apply as well in other scenarios. For instance, the principles could apply as well with respect to a TDD connection encompassing one or more TDD carriers or, for that matter, a connection encompassing a combination of FDD and TDD carriers. In these other scenarios, as above, the UE could divide its air interface into a continuum of time intervals and, iteratively for each time interval, compute the UE's actual average transmit power (e.g., the UE's average aggregate transmit power) and use the computed actual average transmit power as a basis to control the UE's maximum average transmit power (e.g., maximum average aggregate transmit power) in a respective subsequent time interval. The process could thus play out largely in the same manner as described above.

And note that there may additionally be a limitation on the UE's instantaneous transmit power. This additional limit might further restrict how strong the UE's transmission can be at any moment in time.

Figure 3:
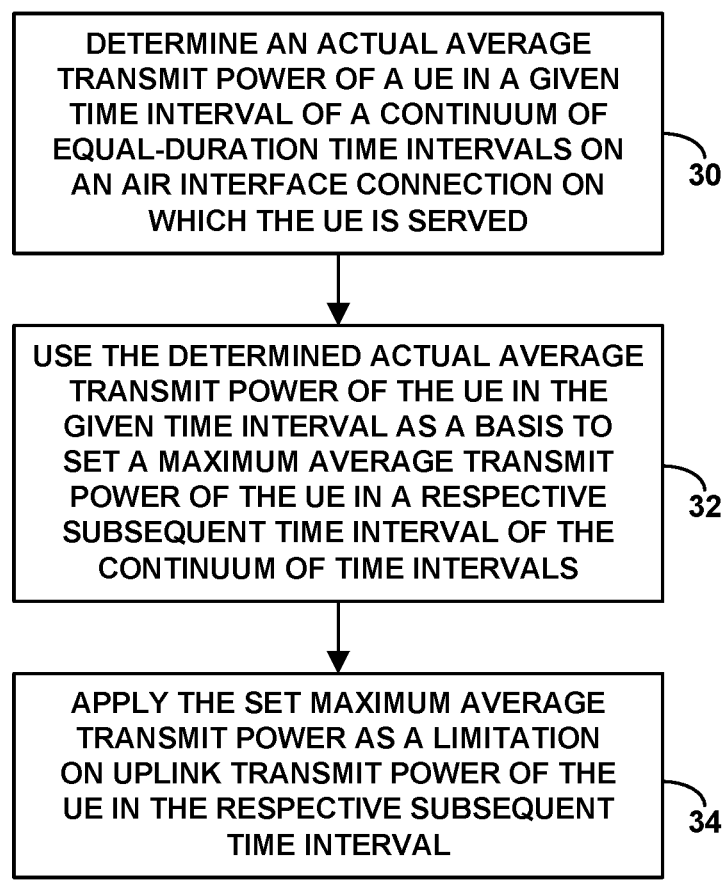
FIG. 3 is a flow chart depicting an example method in accordance with the disclosure.

FIG. 3 is a flow chart depicting a method that could be carried out in accordance with the present disclosure, to control uplink transmit power of a UE. In particular, the method includes iteratively carrying out a set of operations for each given time interval of a continuum of equal-duration time intervals. As shown in FIG. 3, at block 30, the operations include the UE determining an actual average transmit power of the UE in the given time interval. At block 32, the operations further include the UE using the determined actual average transmit power of the UE in the given time interval as a basis to set a maximum average transmit power of the UE in a respective subsequent time interval of the continuum of time intervals. And at block 34, the operations include the UE applying the set maximum average transmit power as a limitation on uplink transmit power of the UE in the respective subsequent time interval.

In practice, the act of the UE determining its actual average transmit power in the given time interval could involve the UE maintaining a rolling average of its actual transmit power across the given time interval. For instance, if the time interval spans five uplink subframes and if the UE's transmit power could vary on a per-subframe basis (e.g., through a power control process as noted above), the UE could update the rolling average at each subframe, so as to compute an overall average of the UE's actual transmit power throughout the given time interval. Further, in this example process, for any subframe where the UE was not actively transmitting on the uplink, the UE could deem its transmit power to be zero.

Note also that the uplink transmit power at issue here could be transmit power for transmission by the UE on an uplink traffic channel, such as a physical uplink shared channel (PUSCH), and/or perhaps for control channel transmission by the UE on an uplink control channel, such as a physical uplink control channel (PUCCH), among other possibilities.

More generally, in line with the discussion above, this method could be carried out when the UE is served on an air-interface connection, which could be defined on a single FDD carrier, on multiple FDD carriers, and/or on at least one TDD carrier.

Further, the actual average transmit power of the UE in the given time interval could be an actual average transmit power of the UE on the air-interface connection in the given time interval, and the act of the UE applying the set maximum average transmit power as a limitation on uplink transmit power of the UE in the respective subsequent time interval could involve limiting by the UE an actual average transmit power of the UE on the air-interface connection in the respective subsequent time interval to be no higher than the maximum average transmit power.

In addition, as discussed above, the UE could be required to limit its uplink transmit power to not exceed a predefined limit (e.g., SAR limit) on average over a predefined time window (e.g., SAR time window), and the time intervals of the continuum of time intervals could be substantially shorter than the predefined time window. For instance, as noted above, the predefined limit could be 23 decibel-milliwatts (dBm), the predefined time window could be 6 minutes, and each time interval of the continuum of time intervals could be no longer than half of the predefined time window.

As further discussed above, the act of using the determined actual average transmit power of the UE in the given time interval as a basis to set the maximum average transmit power of the UE in the respective subsequent time interval could involve (a) the UE making a determination of whether its determined actual average transmit power in the given time interval is less than the predefined limit of uplink transmit power, (b) if the determination is that its determined actual average transmit power in the given time interval is not less than the predefined limit of uplink transmit power, then, based at least on the determination, setting, as its maximum average transmit power in the respective subsequent time interval, the predefined limit of uplink transmit power, and (c) if the determination is that its determined actual average transmit power in the given time interval is less than the predefined limit of uplink transmit power, then, based at least on the determination, the UE computing and setting, as its maximum average transmit power in the respective subsequent time interval, a value based on a sum of (i) the predefined limit of uplink transmit power and (ii) a difference between the predefined limit of uplink transmit power and the determined actual average transmit power of the UE in the given time interval.

Here, the value set as the maximum average transmit power in the respective subsequent time interval could itself be the sum. Alternatively, it could in another manner be based on the sum, such as through further algorithmic manipulation of the sum.

As additionally discussed above, for each given time interval, the respective subsequent time interval can be spaced by the same duration as for each other given time interval. For instance, for each given time interval, the respective subsequent time interval could be the time interval immediately following the given time interval. Or for each given time interval, the respective subsequent time interval could be the time interval that is at least a fixed number, M, of time intervals after the given time interval, where M is at least two.

Figure 4:
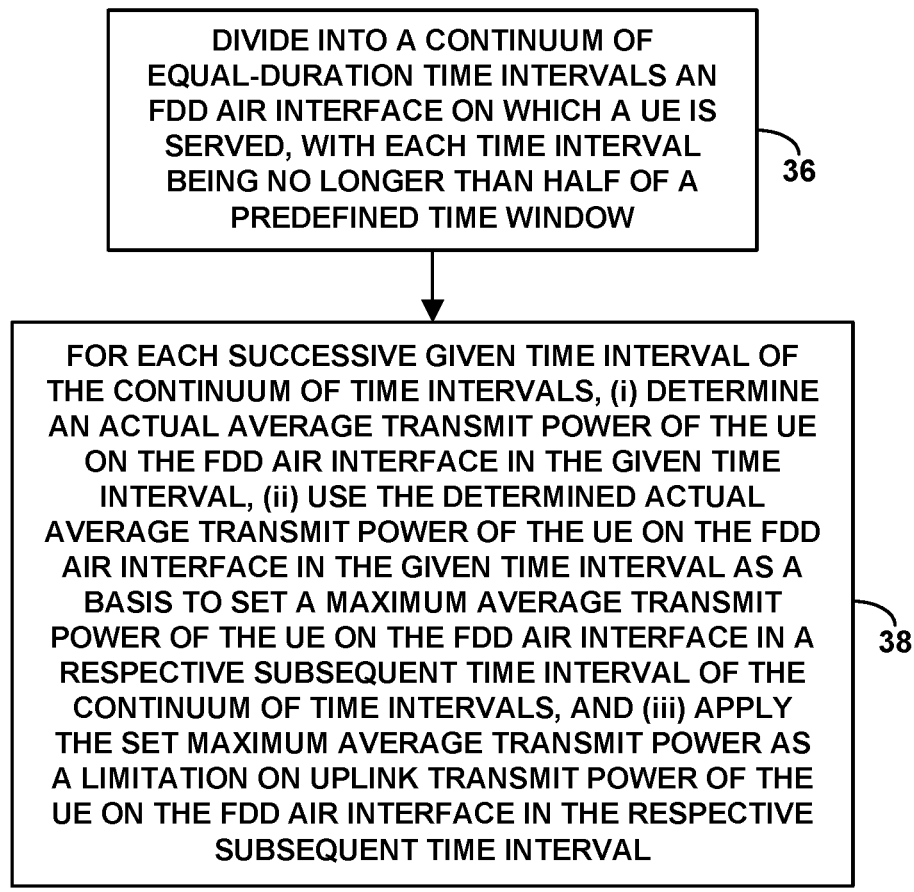
FIG. 4 is another flow chart depicting an example method in accordance with the disclosure.

FIG. 4 is next a flow chart of a method that could be carried out in accordance with the present disclosure, to control uplink transmit power of a UE on an FDD air interface (i.e., an air interface that has co-existing downlink and uplink channels), in a scenario where the UE is required to limit its uplink transmit power to not exceed a predefined limit on average over a predefined time window.

As shown in FIG. 4, at block 36, the method includes the UE dividing the FDD air interface into a continuum of equal-duration time intervals, with each time interval being no longer than half of the predefined time window. And at block 38, the method includes, for each successive given time interval of the continuum of time intervals, (i) the UE determining an actual average transmit power of the UE on the FDD air interface in the given time interval, (ii) the UE using the determined actual average transmit power of the UE on the FDD air interface in the given time interval as a basis to set a maximum average transmit power of the UE on the FDD air interface in a respective subsequent time interval of the continuum of time intervals, and (iii) the UE applying the set maximum average transmit power as a limitation on uplink transmit power of the UE on the FDD air interface in the respective subsequent time interval.

Various features discussed above can be carried out in this context as well, and vice versa.

For example, the act of using the determined actual average transmit power of the UE on the FDD air interface in the given time interval as a basis to set the maximum average transmit power of the UE on the FDD air interface in the respective subsequent time interval could involve (a) the UE making a determination of whether the determined actual average transmit power of the UE in the given time interval is less than the predefined limit of uplink transmit power of the UE, and (b) the UE using the determination as a basis to set its maximum average transmit power in the respective subsequent time interval.

Here, again, for instance, if the determination is that the determined actual average transmit power of the UE in the given time interval is not less than the predefined limit of uplink transmit power of the UE, then, based at least on the determination, setting, the UE could set as its maximum average transmit power in the respective subsequent time interval, the predefined limit of uplink transmit power of the UE. Whereas, if the determination is that the determined actual average transmit power of the UE in the given time interval is less than the predefined limit of uplink transmit power of the UE, then, based at least on the determination, the UE could compute and set, as its maximum average transmit power in the respective subsequent time interval, a sum of (i) the predefined limit of uplink transmit power and (ii) a difference between the predefined limit of uplink transmit power and the actual average transmit power of the UE in the given time interval.

Figure 5:
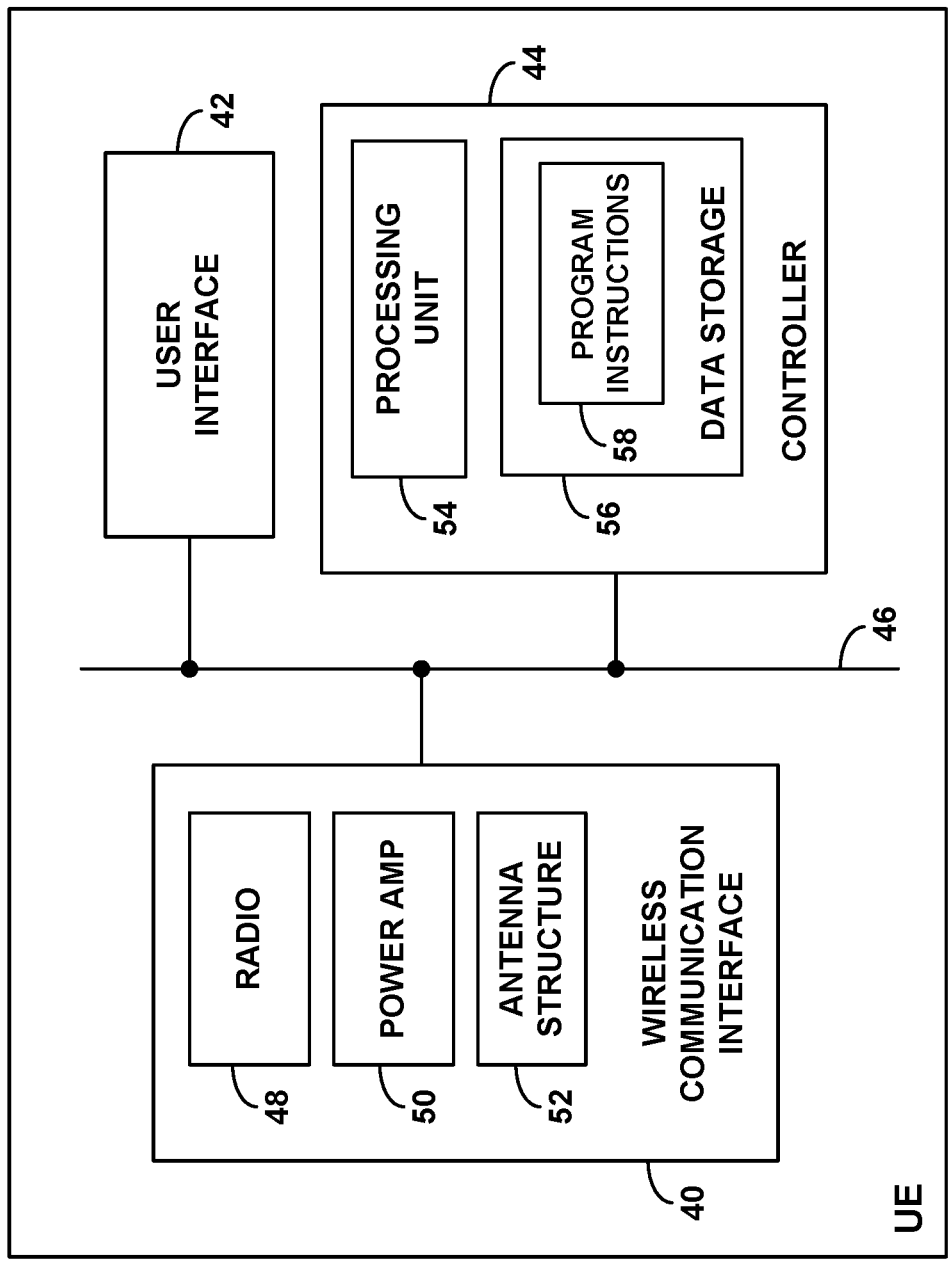
FIG. 5 is a simplified block diagram of an example UE operable in accordance with the disclosure.

Finally, FIG. 5 is a simplified block diagram of an example UE, showing some of the components that could be included to facilitate carrying out operations as described herein. As shown in FIG. 5, the example UE includes a wireless communication interface 40, a user interface 42, and a controller 44. These components could be interconnected, integrated, and/or communicatively linked together in various ways now known or later developed, such as by a system bus or other connection mechanism 46 for instance.

The wireless communication interface 40 could operate to facilitate air interface communication on an air interface defined on one or more RF carriers. As shown, the wireless communication interface could include at least one radio 48, at least one variable-gain power amplifier 50 governing uplink transmit power of the UE on the air interface, and at least one antenna structure 52.

The user interface 42, which could be included if the UE is user operated, could include input and output components (not shown) to facilitate interaction with a user. For instance, the user interface could include analog-to-digital conversion circuitry and could include input components such as a touch screen, microphone, and keypad, and output components such as a display screen and sound speaker.

And the controller 44, which could be integrated with wireless communication interface 40 (e.g., on a common chipset) or provided in another manner could operate to carry out or cause the UE to carry out various operations described herein. As shown, controller 44 could include a at least one processing unit 54 (e.g., one or more general purpose processors such as microprocessors and/or one or more special purpose processors such as application specific integrated circuits), and non-transitory data storage 56 (e.g., one or more volatile and/or non-volatile storage components, such as magnetic, optical and/or flash storage). And non-transitory data storage 56 could hold program instructions 58, which could be executable by the processing unit 56 to carry out the various described operations. Alternatively, the controller could take other forms.

Various features discussed above can be carried out in this context as well, and vice versa.

The present disclosure also contemplates at least one non-transitory computer readable medium having stored thereon (e.g., being encoded with) program instructions executable by at least one processing unit to carry out various operations described above.

Exemplary embodiments have been described above. Those skilled in the art will understand, however, that changes and modifications may be made to these embodiments without departing from the true scope and spirit of the invention.

What is claimed is:

1. A method for controlling uplink transmit power of a user equipment device (UE), the method comprising:
   iteratively for each given time interval of a continuum of equal-duration time intervals:
   (i) determining by the UE an actual average transmit power of the UE in the given time interval,
   (ii) using by the UE the determined actual average transmit power of the UE in the given time interval as a basis to set a maximum average transmit power of the UE in a respective subsequent time interval of the continuum of time intervals, and (iii) applying by the UE the set maximum average transmit power as a limitation on uplink transmit power of the UE in the respective subsequent time interval.

2. The method of claim 1, wherein the method is carried out when the UE is served on an air-interface connection, wherein:
the actual average transmit power of the UE in the given time interval is an actual average transmit power of the UE on the air-interface connection in the given time interval, and
applying by the UE the set maximum average transmit power as a limitation on uplink transmit power of the UE in the respective subsequent time interval comprises limiting by the UE an actual average transmit power of the UE on the air-interface connection in the respective subsequent time interval to be no higher than the maximum average transmit power.

3. The method of claim 2, wherein the air-interface connection is defined on a single frequency division duplex (FDD) carrier.

4. The method of claim 2, wherein the air-interface connection is defined on multiple frequency division duplex (FDD) carriers.

5. The method of claim 2, wherein the air-interface connection is defined on at least one time division duplex (TDD) carrier.

6. The method of claim 2, wherein the UE is required to limit uplink transmit power of the UE to not exceed a predefined limit on average over a predefined time window, and wherein the time intervals of the continuum of time intervals are substantially shorter than the predefined time window.

7. The method of claim 6, wherein the predefined limit is 23 decibel-milliwatts (dBm).

8. The method of claim 6, wherein each time interval of the continuum of time intervals is no longer than half of the predefined time window.

9. The method of claim 6, wherein using the determined actual average transmit power of the UE in the given time interval as a basis to set the maximum average transmit power of the UE in the respective subsequent time interval comprises:
making a determination by the UE of whether the determined actual average transmit power of the UE in the given time interval is less than the predefined limit of uplink transmit power of the UE;
if the determination is that the determined actual average transmit power of the UE in the given time interval is not less than the predefined limit of uplink transmit power of the UE, then, based at least on the determination, setting, as the maximum average transmit power of the UE in the respective subsequent time interval, the predefined limit of uplink transmit power of the UE; and
if the determination is that the determined actual average transmit power of the UE in the given time interval is less than the predefined limit of uplink transmit power of the UE, then, based at least on the determination, computing and setting, as the maximum average transmit power of the UE in the respective subsequent time interval, a value based on a sum of (i) the predefined limit of uplink transmit power and (ii) a difference between the predefined limit of uplink transmit power and the actual average transmit power of the UE in the given time interval.

10. The method of claim 9, wherein the value is the sum.

11. The method of claim 1, wherein for each given time interval of the continuum of time intervals, the respective subsequent time interval immediately follows the given time interval.

12. The method of claim 1, wherein for each given time interval of the continuum of time intervals, the respective subsequent time interval is at least two time intervals after the given time interval.

13. A method for controlling uplink transmit power of a user equipment device (UE) on a frequency division duplex (FDD) air interface having co-existing downlink and uplink channels, wherein the UE is required to limit its uplink transmit power to not exceed a predefined limit on average over a predefined time window, the method comprising:
dividing by the UE the FDD air interface into a continuum of equal-duration time intervals, wherein each time interval is no longer than half of the predefined time window; and
for each successive given time interval of the continuum of time intervals, (i) determining by the UE an actual average transmit power of the UE on the FDD air interface in the given time interval, (ii) using by the UE the determined actual average transmit power of the UE on the FDD air interface in the given time interval as a basis to set a maximum average transmit power of the UE on the FDD air interface in a respective subsequent time interval of the continuum of time intervals, and (iii) applying by the UE the set maximum average transmit power as a limitation on uplink transmit power of the UE on the FDD air interface in the respective subsequent time interval.

14. The method of claim 13, wherein using the determined actual average transmit power of the UE on the FDD air interface in the given time interval as a basis to set the maximum average transmit power of the UE on the FDD air interface in the respective subsequent time interval comprises:
making a determination by the UE of whether the determined actual average transmit power of the UE in the given time interval is less than the predefined limit of uplink transmit power of the UE;
if the determination is that the determined actual average transmit power of the UE in the given time interval is not less than the predefined limit of uplink transmit power of the UE, then, based at least on the determination, setting, as the maximum average transmit power of the UE in the respective subsequent time interval, the predefined limit of uplink transmit power of the UE; and
if the determination is that the determined actual average transmit power of the UE in the given time interval is less than the predefined limit of uplink transmit power of the UE, then, based at least on the determination, computing and setting, as the maximum average transmit power of the UE in the respective subsequent time interval, a sum of (i) the predefined limit of uplink transmit power and (ii) a difference between the predefined limit of uplink transmit power and the actual average transmit power of the UE in the given time interval.

15. A user equipment device (UE) comprising:
a wireless communication interface for engaging in air interface communication on an air interface defined on one or more radio-frequency carriers, wherein the wireless communication interface includes at least one variable-gain amplifier governing uplink transmit power of the UE on the air interface; and a controller configured to cause the UE to carry out operations iteratively for each successive given time interval of a continuum of time intervals defined on the air interface, the operations including:

determining an actual average transmit power of the UE on the air interface in the given time interval, using the determined actual average transmit power of the UE on the air interface in the given time interval as a basis to set a maximum average transmit power of the UE on the air interface in a respective subsequent time interval of the continuum of time intervals, and applying the set maximum average transmit power as a limitation on uplink transmit power of the UE on the air interface in the respective subsequent time interval.

16. The UE of claim 15, wherein applying the set maximum average transmit power as a limitation on uplink transmit power of the UE on the air interface in the respective subsequent time interval comprises limiting by the UE an actual average transmit power of the UE on the air interface in the respective subsequent time interval to be no higher than the maximum average transmit power.

17. The UE of claim 15, wherein the air interface is defined on at least a frequency division duplex (FDD) carrier.

18. The UE of claim 15, wherein the UE is required to limit uplink transmit power of the UE to not exceed a predefined limit on average over a predefined time window, and wherein the time intervals of the continuum of time intervals are no longer than one half of the predefined time window.

19. The UE of claim 18, wherein using the determined actual average transmit power of the UE in the given time interval as a basis to set the maximum average transmit power of the UE in the respective subsequent time interval comprises:

making a determination of whether the determined actual average transmit power of the UE in the given time interval is less than the predefined limit of uplink transmit power of the UE;

if the determination is that the determined actual average transmit power of the UE in the given time interval is not less than the predefined limit of uplink transmit power of the UE, then, based at least on the determination, setting, as the maximum average transmit power of the UE in the respective subsequent time interval, the predefined limit of uplink transmit power of the UE;

if the determination is that the determined actual average transmit power of the UE in the given time interval is less than the predefined limit of uplink transmit power of the UE, then, based at least on the determination, computing and setting, as the maximum average transmit power of the UE in the respective subsequent time interval, a sum of (i) the predefined limit of uplink transmit power and (ii) a difference between the predefined limit of uplink transmit power and the actual average transmit power of the UE in the given time interval.

20. The UE of claim 15, wherein the controller comprises a processing unit and program instructions executable by the processing unit to cause the UE to carry out the operations.

* * * * *